United States Patent
Therkildsen (10) Patent No.: US 9,017,007 B2
(45) Date of Patent: Apr. 28, 2015

(54) PALLET TURNTABLE, A METHOD FOR TURNING A PALLET AND USE OF A PALLET TURNTABLE

(75) Inventor: Jens Bregnbjerg Therkildsen, Uldum (DK)

(73) Assignee: JBT Maskinvaerksted, Uldum (DK)

( * ) Notice: Subject to any disclaimer, the term of this patent is extended or adjusted under 35 U.S.C. 154(b) by 15 days.

(21) Appl. No.: 13/636,465

(22) PCT Filed: May 4, 2010

(86) PCT No.: PCT/DK2010/000061
§ 371 (c)(1),
(2), (4) Date: Sep. 21, 2012

(87) PCT Pub. No.: WO2011/137899
PCT Pub. Date: Nov. 10, 2011

(65) Prior Publication Data
US 2013/0017051 A1    Jan. 17, 2013

(51) Int. Cl.
*B65G 47/22* (2006.01)
*B65G 69/26* (2006.01)
*B65G 47/244* (2006.01)
*B65G 57/24* (2006.01)
*B66F 7/06* (2006.01)
(Continued)

(52) U.S. Cl.
CPC ............... *B65G 69/26* (2013.01); *B65B 11/045* (2013.01); *B65G 47/244* (2013.01); *B65G 57/245* (2013.01); *B66F 7/0633* (2013.01); *B66F 7/08* (2013.01)

(58) Field of Classification Search
USPC ............. 414/754, 792.2, 792.3, 792.7, 793.8, 414/794.6, 799; 187/240
See application file for complete search history.

(56) References Cited

U.S. PATENT DOCUMENTS 2,089,082 A * 8/1937 Woodman ................... 254/103
2,675,928 A * 4/1954 Slater .......................... 414/792.2
3,513,992 A * 5/1970 Handler ........................ 414/259
(Continued)

FOREIGN PATENT DOCUMENTS

FR    2228697 A1    12/1974
FR    2600973 A1    1/1988
(Continued)

OTHER PUBLICATIONS

International Search Report for PCT/DK2010/000061, 2 pages, mailed Feb. 4, 2011.

*Primary Examiner* — Saul Rodriguez
*Assistant Examiner* — Lynn Schwenning
(74) *Attorney, Agent, or Firm* — William J. Sapone; Ware Fressola Maguire & Barber LLP (57) ABSTRACT

The invention provides for a pallet turntable (1). The turntable (1) comprises a stationary bottom part (2) and a movable top part (3) comprising a platform (4) suitable for receiving a pallet (5), wherein the movable top part (3) is arranged linearly displaceable in a vertical direction with respect to the stationary bottom part (2). The turntable (1) further comprises guide means (6) for guiding an angular displacement around a direction of the vertical linear displacement in dependency of the linear displacement, at least when the movable top part (3) is being vertically linearly displaced in a direction towards the stationary bottom part (2). The invention further provides for a method for turning a pallet (5) and use of a pallet turntable (1).

12 Claims, 5 Drawing Sheets

(51) Int. Cl.
    *B66F 7/08*    (2006.01)
    *B65B 11/04*    (2006.01)

(56)            References Cited

U.S. PATENT DOCUMENTS

| 4,494,645 | A | * | 1/1985 | Hessling et al. | 198/414 |
| 5,143,198 | A | * | 9/1992 | Hale et al. | 198/414 |
| 5,165,504 | A | * | 11/1992 | Lecorre | 187/245 |
| 5,299,906 | A | * | 4/1994 | Stone | 187/275 |
| 5,538,357 | A | * | 7/1996 | Boswell, Sr. | 404/1 |
| 6,000,902 | A | * | 12/1999 | Mueller et al. | 414/758 |
| 6,537,017 | B2 | * | 3/2003 | Stone | 414/672 |
| 2006/0283669 | A1 | * | 12/2006 | Patten et al. | 187/269 |
| 2008/0105172 | A1 | * | 5/2008 | Repasky | 108/144.11 |
| 2008/0246204 | A1 | * | 10/2008 | Wilkinson et al. | 269/61 |

FOREIGN PATENT DOCUMENTS

| JP | 1111641 A | 4/1989 |
| WO | WO2009/047620 A | 4/2009 |

* cited by examiner

PALLET TURNTABLE, A METHOD FOR TURNING A PALLET AND USE OF A PALLET TURNTABLE

CROSS REFERENCE TO RELATED APPLICATIONS

This application is a national stage of PCT International patent application no. PCT/DK2010/000061, filed 4 May 2010, the contents of which are hereby incorporated by reference.

BACKGROUND OF THE INVENTION

The invention relates to a pallet turntable. The invention further relates to a method for turning a pallet and use of a pallet turntable.

Description of the Related Art

As use of pallets for storage and transportation of goods becomes more and more common the need for efficient pallet handling becomes more distinct.

When loading palletized goods on a truck, in pallet storages and in particular in pick and pack warehouses where goods are picked directly from the pallet it is important that the pallet is orientated correctly. This means that the pallet's orientation, e.g. when it is picked up of a truck bed, may have to be changed before the pallet is placed in a storage rack. The orientation of the pallet can be change e.g. 180° or 270° but typically it will be changed 90° so that a pallet lifting device will have to change engagement position from a long side of the pallet to an end side of the pallet or visa-versa. This is typically done by placing the pallet on the ground, drive around to one of the two adjacent pallet sides, engage the pallet and lift it of the ground again where after it can be placed at its destination with the correct orientation.

E.g. from WO 2009/047620 A2 it is known to use an electrical motor driven pallet turntable in relation with a pallet wrapping machine. Such a turntable could be used to change the orientation of a pallet but a turntable like this is both complex and expensive.

An object of the invention is therefore to provide for a cost-efficient pallet turntable which easily can change the orientation of a pallet.

SUMMARY OF THE INVENTION

The invention provides for a pallet turntable. The turntable comprises a stationary bottom part and a movable top part comprising a platform suitable for receiving a pallet, wherein the movable top part is arranged linearly displaceable in a vertical direction with respect to the stationary bottom part. The turntable further comprises guide means for guiding an angular displacement around a direction of the vertical linear displacement in dependency of the linear displacement, at least when the movable top part is being vertically linearly displaced in a direction towards the stationary bottom part.

Providing a pallet turntable with guide means which links the substantially vertical downwards movement of the movable top part to a rotating motion of the movable top part in relation the stationary bottom part is advantageous, in that it hereby is possible to turn the pallet simply by placing the pallet on the platform of the movable top part and let the force of gravity—acting on the pallet—drive the angular displacement of the pallet.

It should be emphasised that the term ""pallet"" is to be understood as a flat transport structure that supports goods usually in a stable fashion while being stored, transported or lifted by a crane, forklift, pallet jack, front loader or other jacking device. A pallet is the structural foundation of a unit load which allows handling and storage efficiencies. A pallet is typically made of wood but can also be made of plastic, metal, paper, any combination thereof or any other material suitable for forming a structural foundation of a load.

In an aspect of the invention, said pallet turntable further comprises a spring member arranged to operate between said stationary bottom part and said movable top part.

Providing a spring member between the stationary bottom part and the movable top part is advantageous in that it hereby is possible to store at least some of the kinetic energy provided by the downwards motion of the moveable top part as potential energy in the spring member. When the pallet is removed from the moveable top part the stored energy can then be released and converted into kinetic energy driving the movable top part back into its initial position.

In an aspect of the invention, said spring member is arranged to force said movable top part away from said stationary bottom part in said vertical direction.

Hereby is achieved an advantageous embodiment of the invention.

In an aspect of the invention, the force of said spring member is so great that said spring member will force said movable top part into an extreme top position when no load is placed on said turntable and at the same time so week that a pallet placed on said turntable and weighing in excess of 50 kg will force the moveable top part downwards.

Making the spring member so strong that it will move the movable top part back into its initial position when the turntable is not loaded, is advantageous in that the idle time, i.e. the time when the turntable is not loaded, can then be used to prepare the turntable for the next pallet orientation changing operation, hereby providing a more efficient turntable.

For the spring member to return the moveable top part back into its initial top position, the spring member will not only have to overcome the force of gravity acting on the moveable top part. It will also have to overcome the internal friction especially in the guide means and the force of gravity, acting on a load placed on the turntable, will therefore initially have to overcome this friction before the moveable top part starts to move downwards.

However, if the spring member is too strong, a load placed on the turntable will not be able to overcome the force of the spring member and the turntable will therefore not be able to change the orientation of the pallet.

It is therefore advantageous that the spring is so weak that a pallet weighing in excess of 50 kg, placed on the turntable, will start the orientation changing action of the turntable in that the gravitational force on a +50 kg load will be enough to ensure that the turntable always will be forced downwards even if the internal friction is slightly increased due to changing viscosity in lubrication means, dirt building up in the movable parts or other.

In an aspect of the invention, said spring member comprises a fluid powered actuator.

Making the spring member comprise a fluid powered actuator enables that a flow control valve can be mounted on the entrance or the exit fluid passage of the actuator. This is advantageous, in that it hereby is possible to better control the storage and the re-release of the kinetic energy in and from the spring member.

In an aspect of the invention, said fluid powered actuator is in fluid communication with a pressure accumulator.

Connecting the fluid powered actuator to a pressure accumulator is advantageous in that it provides simple and efficient means for storing the kinetic energy so that it may be released when the load is removed from the turntable to enable that the moveable top part is forced back into the top position.

In an aspect of the invention, said guide means comprise one or more guide members connected to a first part of said stationary bottom part and said movable top part and one or more track means connected to or formed by a second part of said stationary bottom part and said movable top part.

Hereby is achieved an advantageous embodiment of the invention.

In an aspect of the invention, said track means is arranged as a cavity formed integrally in said stationary bottom part.

Forming the track means integrally as a cavity in the stationary bottom part is advantageous in that it provides for simple and inexpensive track means.

In an aspect of the invention, a start part and/or an end part of said track means is formed with a smaller inclination than a middle part of said track means.

If the inclination at the beginning of the track is too steep the pallet will start turning at a great speed as soon as it is placed on the turntable, hereby making it more difficult to remove the lifting means from the pallet and if the inclination of the track at the end is too steep, the pallet will have to decelerate very quickly hereby increasing the strain on the mechanical system of the turntable and increasing the risk of the pallet sliding on the turntable and thereby jeopardising the position of the pallet.

However if the entire track was made with only a small inclination the total time for changing the orientation of the pallet will be increased and it is therefore advantageous to make the track means with a relatively small inclination at the beginning and/or at the end of the track and then form the middle part of the track with a relatively large inclination.

In an aspect of the invention, said one or more guide members comprises one or more bearings.

Bearings have low friction and are relatively inexpensive and are therefore advantageous for enabling a low friction connection between the stationary bottom part and the moveable top part.

In an aspect of the invention, said guide means is arranged for guiding said angular displacement around said direction of said vertical linear displacement in dependency of said linear displacement, both when said movable top part is being vertically linearly displaced in a direction towards said stationary bottom part and when said movable top part is being vertically linearly displaced in a direction away from said stationary bottom part.

Forming the turntable so that the rotation of the moveable top part is linked to the linear movement of the moveable top part both when the moveable top part is moving downwards and upwards is advantageous in that it provides for a very simple and inexpensive track means design.

In an aspect of the invention, said guide means is arranged so that a full motion of said movable top part from an extreme top position to an extreme bottom position will result in a substantially 90° angular displacement of said movable top part in relation to said stationary bottom part around said direction of said vertical linear displacement.

Making a full motion of the moveable top part turn the pallet 90° is advantageous in that a forklift or similar lifting means engaging an end side of a pallet can place the pallet on the turntable, disengage the pallet by reversing a bit and pick the pallet up at the long side simply by lowering the forks a bit and drive forwards.

Furthermore, the invention provides for a method for turning a pallet. The method comprises the steps of:
placing the pallet on a platform of a pallet turntable. The turntable includes a movable top part arranged vertically above a stationary bottom part so that the movable top part is linearly displaceable in a vertical direction with respect to the stationary bottom part, and
displacing the movable top part including the pallet in a downwards going spiral by means of the gravitational force acting on the pallet.

Using the force of gravity acting on the pallet placed on the turntable to drive an angular displacement of the pallet is advantageous in that it enables a very simple and inexpensive turntable design.

Furthermore, driving the rotation by means of gravity enables that external power in the form of electrical power supply, pneumatic power supply or hydraulic power supply as well as internal power supply such as batteries can be avoided. This enables a simple installation of the turntable since it does not have to be connected to a power supply.

In an aspect of the invention, said pallet turntable is a pallet turntable according to any of the previously mentioned embodiments of a turntable according to the invention.

Even further the invention provides for the use of a pallet turntable according to any of the previously mentioned embodiments of a turntable according to the invention for turning a pallet comprising goods, wherein said pallet and said goods have a total weight in the excess of 50 kg.

BRIEF DESCRIPTION OF THE DRAWINGS

The invention will be described in the following with reference to the figures in which.

DETAILED DESCRIPTION OF THE INVENTION

Figure 1:
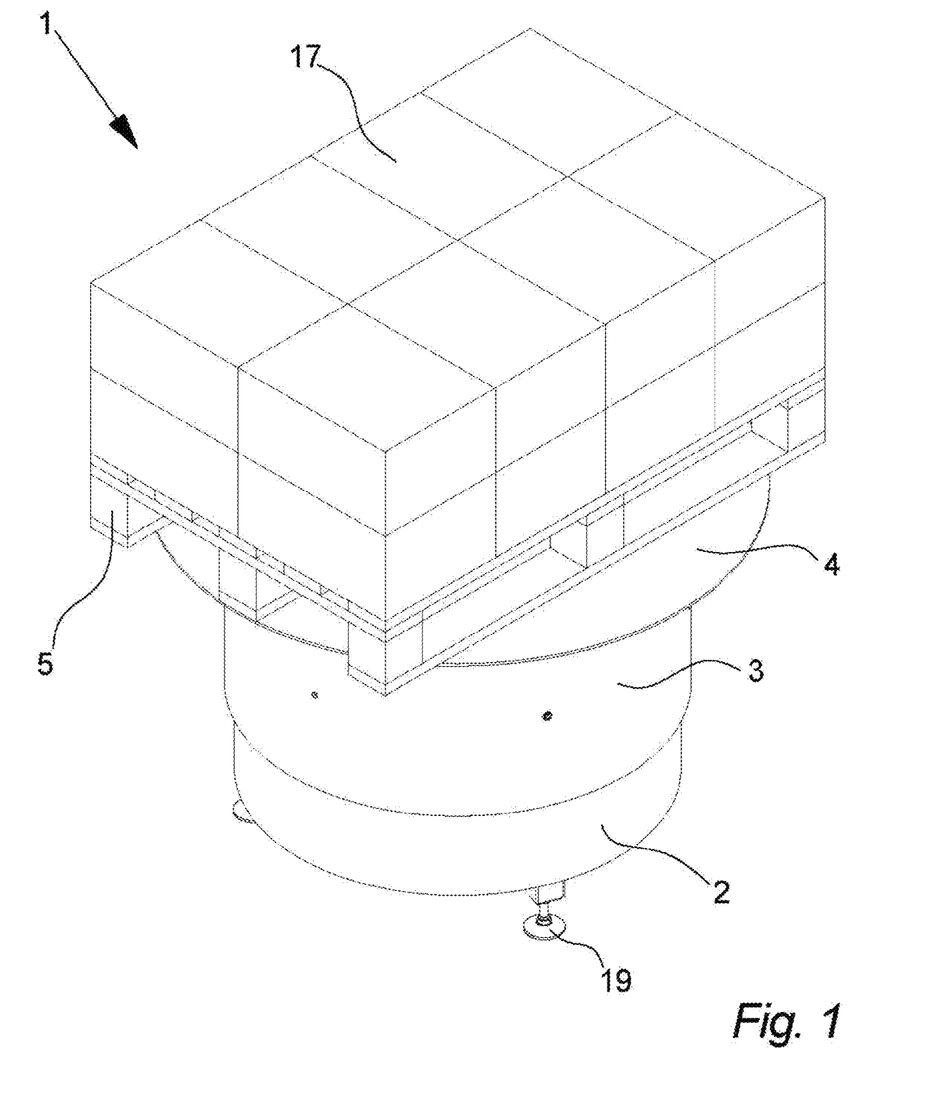
FIG. 1 illustrates an embodiment of a pallet turntable according to the invention, as seen in perspective.

FIG. 1 illustrates an embodiment of pallet turntable 1 according to the invention, as seen in perspective.

The pallet turntable 1 comprises a stationary bottom part 2 placed on the ground and a movable top part 3 arranged vertically on top of the stationary bottom part 2. The movable top part 3 comprises a platform 4 which in this embodiment of the invention is formed as a single round plate forming the top of the movable top part 3. However, in another embodiment of the invention the platform 4 could be formed by a number of individual plates, by a tube construction or individual tubes, a lattice work, any combination thereof or any other device or construction suitable for receiving a pallet 5.

A pallet 5 comprising goods 17 packed in boxes is placed on the pallet turntable 1 so that the pallet 5 may be turned 90°. In this embodiment the pallet 5 is placed on the turntable 1 by means of a fork lift truck but in another embodiment the pallet 5 could be placed on and/or removed from the pallet turntable 1 by means of a pallet jack, a crane, a hoist or manually.

In this embodiment of the invention the pallet 5 is a standardized EURO pallet measuring 800 by 1200 by 120 mm, but in another embodiment of the invention the pallet 5 could be a EURO pallet of a different size or it could be any kind of ISO pallets, Grocery Manufacturers' Association (GMA) pallets, Australian Standard pallets or any other kind of flat transport structure that is suitable for supporting goods while being stored, transported or lifted by a lifting device such as a crane, forklift, pallet jack, front loader or other jacking devices.

In this embodiment of the invention the pallet turntable 1 touches the ground in only three different points substantially evenly distributed along the periphery of the stationary bottom part 2. This ensures that the forks of a fork lift truck or a pallet jack can easily be driven in under the pallet turntable 1 if the pallet turntable 1 needs to be moved whichever side the truck or jack approaches the turntable 1 from. Furthermore, touching the ground through only three points also ensures that the turntable 1 never wobbles. However, in another embodiment the turntable 1 could touch the ground through more points such as four, five, six or more.

In this embodiment of the invention the stationary bottom part 2 is provided with machine feet 19 to ensure that platform 4 of the turntable 1 easily can be adjusted to flush with a horizontal plane even if the underlying ground in uneven. However in another embodiment the turntable 1 could comprise other foot means such as pipes, tubes, dedicated plates or other means e.g. enabling that the turntable 1 could be fixed to the ground.

Figure 2:
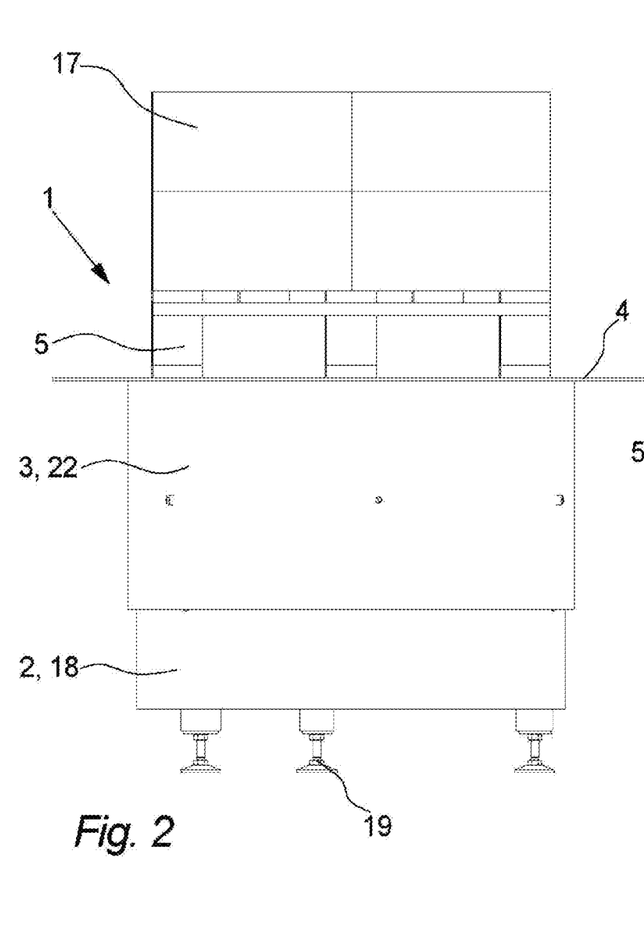
FIG. 2 illustrates a pallet turntable with the movable top part in an extreme top position, as seen from the front.

FIG. 2 illustrates a pallet turntable 1 with the movable top part 3 in an extreme top position, as seen from the front.

In this embodiment of the invention a pallet 5 comprising boxed goods 17 has just been placed on the platform 4 of the turntable 1 and the lifting means (not shown) which has placed the pallet 5 has been disengaged from the pallet 5.

In this embodiment of the invention the downwards spiral motion of the movable top part 3 containing the pallet 5 will start as soon at the force of gravity acting on the pallet 5 exceeds the internal friction in the moveable parts of the turntable 1 i.e. the parts of the turntable 1 enabling the spiral motion. This means that the pallet 5 most likely will press slightly on the forks while the forks are reversed out of the pallet 5. If this force is only marginal and if the friction between the pallet 5 and the platform 4 is of a certain magnitude, this substantially transversal force on the forks will have none or very little impact on the operation of the turntable 1 and on the position of the pallet 5 on the turntable 1.

However, e.g. if the downwards spiral motion of the moveable top part 3 was driven by more than gravity force acting on the pallet 5—such as by a preloaded spring, an actuator or other pulling downwards in the moveable top part 3—, if the pallet 5 was particularly light, if the friction between the pallet 5 and the platform 4 was relatively low or if other similar circumstances where present it is possible that the turntable 1 could be provided with some sort of lock or brake ensuring that the downwards motion of the turntable 1 is only possible when the lock or brake is disengaged.

If the turntable 1 was provided with an pneumatic or hydraulic actuator acting between the stationary bottom part 2 and the moveable top part 3 this lock or brake could be enabled as an on/off valve connected to the entrance or the exit port of the actuator.

Otherwise, the brake or lock could be formed by any kind of actuator such as a hydraulic cylinder, a pneumatic cylinder or an electrical solenoid which could brake or lock the mutual motion between the stationary bottom part 2 and the moveable top part 3 either directly or by means of a pawl, a pin, a latch or the like which could be connected to one part and then selectively engage the other or it could function by means of a wedging action.

If this lock or brake was electrical, hydraulically or pneumatically powered the turntable would have to be connected to an external power source or it would have to comprise a battery or the like. If the turntable was provided with a battery this battery could e.g. be charged by an electrical generator being driven by the relative motion between the stationary bottom part 2 and the moveable top part 3.

If this lock or brake was electrical, hydraulically or pneumatically powered it could be released by a manually activated switch on the turntable 1, by remote control or it could be activated by a sensor on or in the pallet turntable 1 e.g. a inductive sensor sensing the presence of forks, a capacitive sensor sensing the presence of a pallet 5, a optical sensor sensing the presence of a pallet 5, a load cell sensing a load on the turntable 1 or any combination hereof.

The mutual motion between the stationary bottom part 2 and the moveable top part 3 could also be locked by simple manually operated and driven means.

Figure 3:
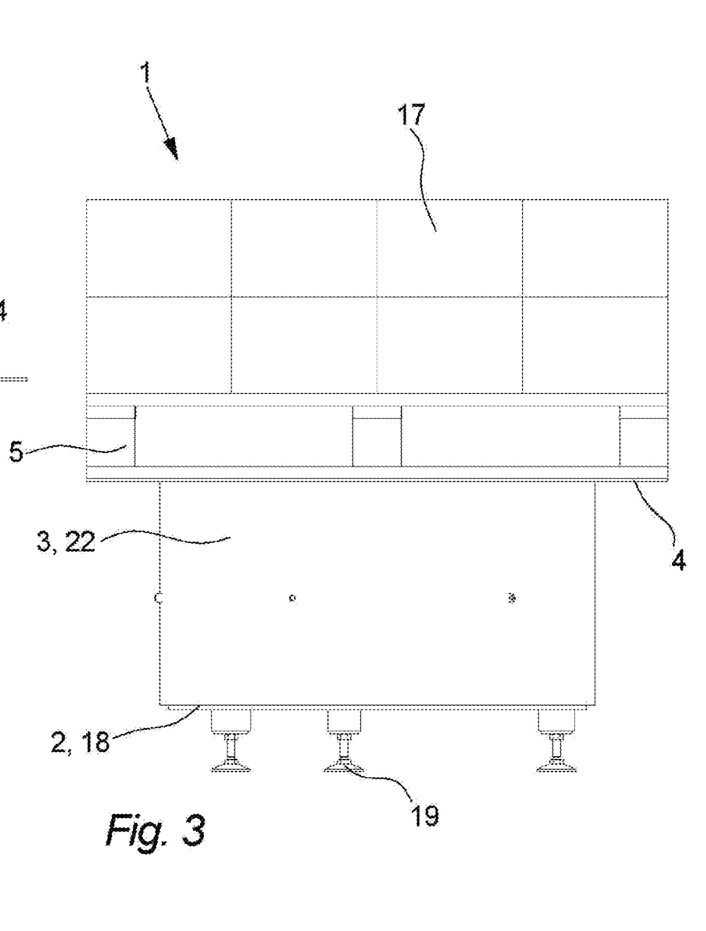
FIG. 3 illustrates a pallet turntable with the movable top part in an extreme bottom position, as seen from the front.

FIG. 3 illustrates a pallet turntable 1 with the movable top part 3 in an extreme bottom position, as seen from the front.

When the forks of the lifting means have disengaged the pallet 1 or when the brake or lock has disengaged the moveable top part 3 including the pallet 5, the moveable top part 3 will start its downward orientated spiral motion. In this embodiment of the invention this motion continues until the pallet is turned 90° in the horizontal plane i.e. turned 90° around a substantially vertical axis extending in the same direction as the vertical linear motion of the moveable top part 3.

When the 90° angular displacement of the pallet 5 has ended the pallet 5 can be picked of the turntable 1 at a different and lower level than when the pallet 5 was placed on the turntable 1.

In another embodiment of the invention the moveable top part 3 could turn the pallet 5 30°, 60°, 120°, 180°, 270° or another number of degrees before the rotating stops.

Figure 4:
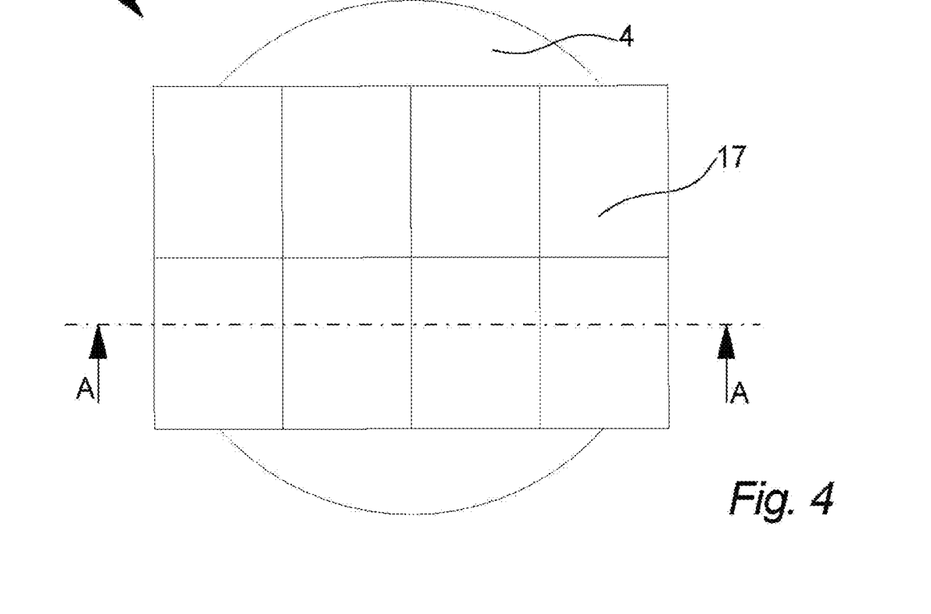
FIG. 4 illustrates a pallet turntable, as seen from the top.

FIG. 4 illustrates a pallet turntable 1, as seen from the top.

In this embodiment of the invention the platform 4 of the turntable 1 is formed as a single round plate. And it is advantageous to form the platform 4 rotationally symmetric so that the pallet 5 can be placed on the platform 5 and picked of the platform 4 from any side. However in another embodiment the platform 4 could be formed as a square, as a rectangle, as a polygon or other.

Figure 5:
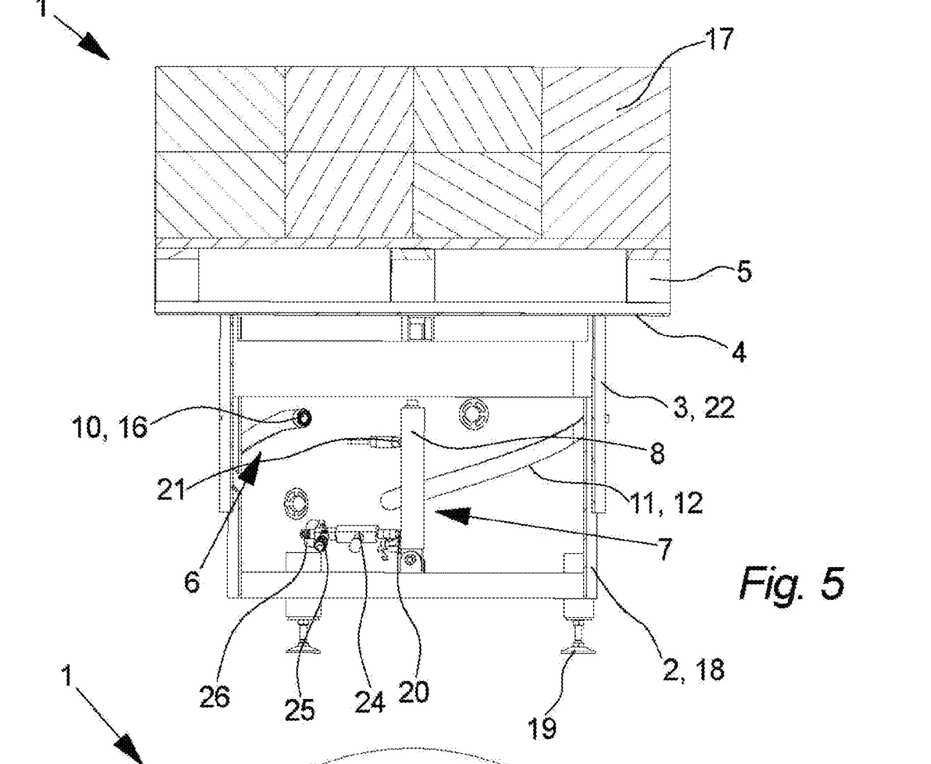
FIG. 5 illustrates a cross section of a pallet turntable, as seen from the front.

The line marked by the arrows A-A illustrates where the cross section illustrated in FIG. 5 is made.

FIG. 5 illustrates a cross section of a pallet turntable 1, as seen from the front.

The moveable top part 3 could be returned to its top position by hand or by external lifting means, but in a preferred embodiment of the invention the pallet turntable 1 is provided with a spring member 7 between the stationary bottom part 2 and the movable top part 3 so that at least some of the kinetic energy provided by the downwards spiral motion of the moveable top part 3 can be stored in the spring member 7 as potential energy. When the pallet 5 is removed from the moveable top part 3 the stored energy can then be released and converted into kinetic energy driving the movable top part 3 back into its initial position.

In this embodiment of the invention the spring member 7 comprises a fluid powered actuator 8 connected to the stationary bottom part 2 and pushing against the movable top part 3. In this embodiment the fluid powered actuator 8 is a single acting hydraulic cylinder but it could also be a pneumatic cylinder.

A single acting hydraulic cylinder 8 typically only has one port but in this embodiment the cylinder 8 is provided with both a bottom port 20 and a top port 21. The top port 21 is in this embodiment only used for removing unwanted air trapped in the cylinder.

In this embodiment the bottom port 20 of the fluid powered actuator 8 is connected to a pressure accumulator (not shown on FIG. 5) so that the fluid, pressed out of the cylinder 8 by the force of gravity acting on the pallet 5 placed on the moveable top part 3, will compress an air or gas filled bladder or a spring loaded compartment in the pressure accumulator. The kinetic energy is hereby stored in the pressure accumulator and when the pallet 5 is removed from the turntable 1 the fluid will be pressed back into the cylinder 8 and force the moveable top part 3 back up into its initial top position.

To ensure that the moveable top part 3 always descents at substantially the same speed substantially no matter how much the pallet 5 weighs, the fluid connection between the bottom port 20 and the pressure accumulator is provided with a pressure compensating throttle check valve 24, which will act on the fluid flow when the fluid is pressed from the fluid powered actuator 8 to the pressure accumulator. Since the load on the turntable 1 is always the same when the moveable top part 3 is moving upwards, the fluid connection between the bottom port 20 and the pressure accumulator is only provided with a simple throttle check valve 25 for controlling the flow of the fluid when the fluid is pressed from the pressure accumulator to the fluid powered actuator 8. In this embodiment of the invention the bottom port 20 is also connected to a pressure gauge 26 so that the actual pressure of the fluid in the spring member 7 may be manually read.

However, it should be understood that in another embodiment of the invention the spring member 7 could also simply be a spring, an air cushion, a pneumatic spring or any other kind of resilient element capable of storing kinetic energy in a first direction, as potential energy and then release the energy back again as kinetic energy in a direction opposite said first direction. The spring member 7 could also comprise a combination of the above mentioned spring arrangements e.g. combined with shock absorbers, end cushions or other equipments ensuring a more optimal turning of the pallet 5.

In this embodiment of the invention the turntable 1 is further provided with guide means 6 for guiding the rotation of the moveable top part 3 in dependency of vertically linearly displacement of the moveable top part 3, so that the moveable top part 3 describes a downwards descending spiral when it descents.

In this embodiment of the invention the guide means 6 comprises track means 11 formed as a cavity 12 in the bottom casing 18 of the stationary bottom part 2. However in another embodiment the track means 11 could be formed by separate tracks, guides or similar connected to the bottom casing 18, to another part of the stationary bottom part 2 or it could be supported directly on the underlying ground.

In this embodiment of the invention the guide means 6 also comprises guide members 10 connected to the moveable top part 3. In this embodiment the guide members 10 are bearings 16 engaging the cavities 12 in the bottom casing 18 of the stationary bottom part 2 but in another embodiment the guide members 10 could be plain bearings, pins, wheels or other members suited for being guided by track means 11.

Connecting the track means 11 to the bottom casing 18 of the stationary bottom part 2 and the guide members 10 to the top casing 22 of the moveable top part 3 is advantageous in that the closed top casing 22 of the moveable top part 3 can act as a covering of the guide means 6 so that it not possible to get something jammed or caught in the guide means 6 from the outside of the turntable 1.

Figure 6:
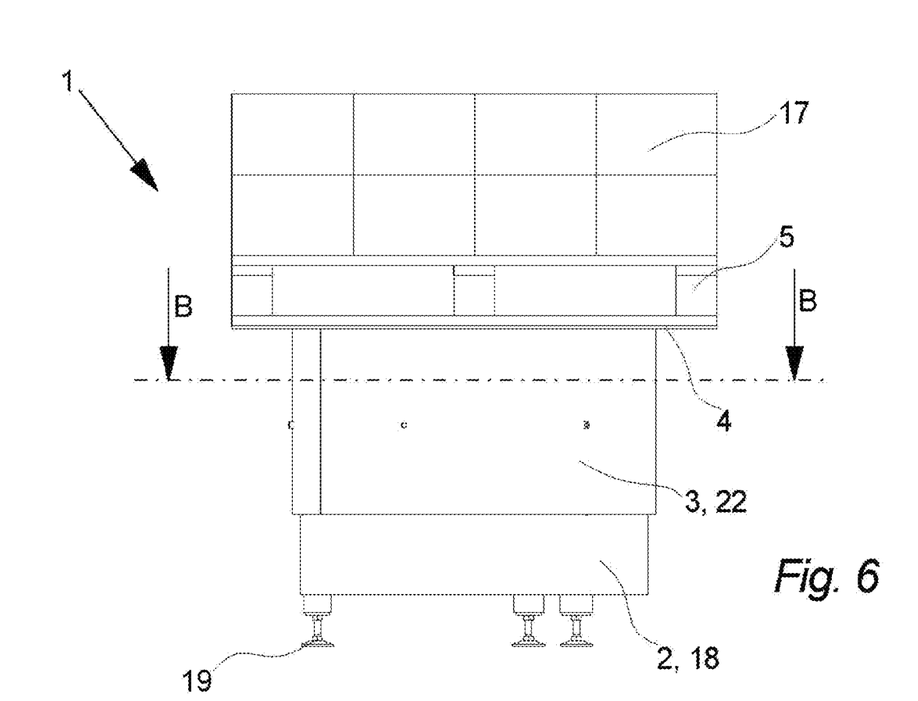
FIG. 6 illustrates a pallet turntable, as seen from the side.

FIG. 6 illustrates a pallet turntable 1, as seen from the side.

In this embodiment of the invention the moveable top part 3 comprises a round top casing 21 concentrically overlapping a round bottom casing 18 of the stationary bottom part 2. However in another embodiment the top casing 21 and/or the bottom casing 18 could be formed differently e.g. square, rectangular, polygonal or other.

Figure 7:
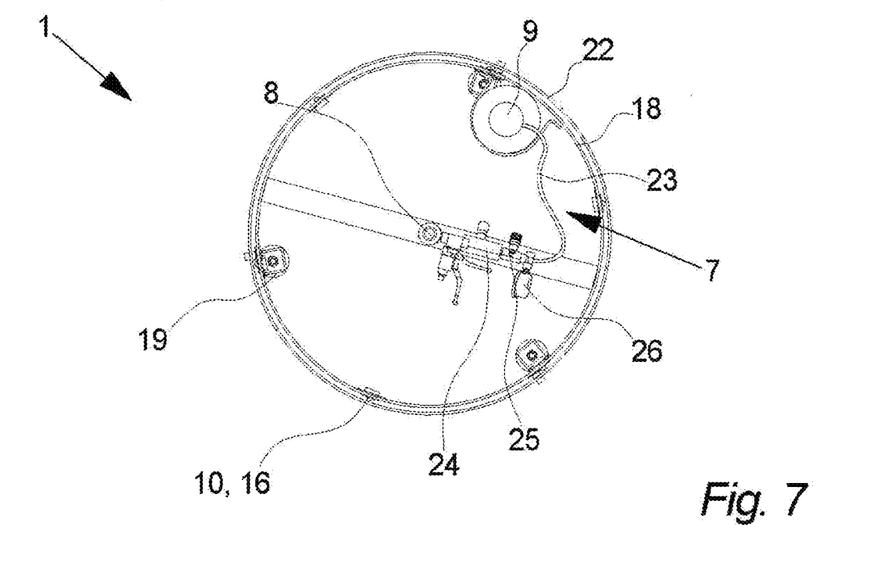
FIG. 7 illustrates a cross section of a pallet turntable, as seen from the top.

The line marked by the arrows B-B illustrates where the cross section illustrated in FIG. 7 is made.

FIG. 7 illustrates a cross section of a pallet turntable 1, as seen from the top.

In this embodiment of the invention the spring member 7 is provided with a pressure accumulator 9 connected to the inner wall of the bottom casing 18 of the stationary bottom part 2. The pressure accumulator 9 is in fluid communication with the fluid powered actuator 8 by means of a fluid connection 23.

Figure 8:
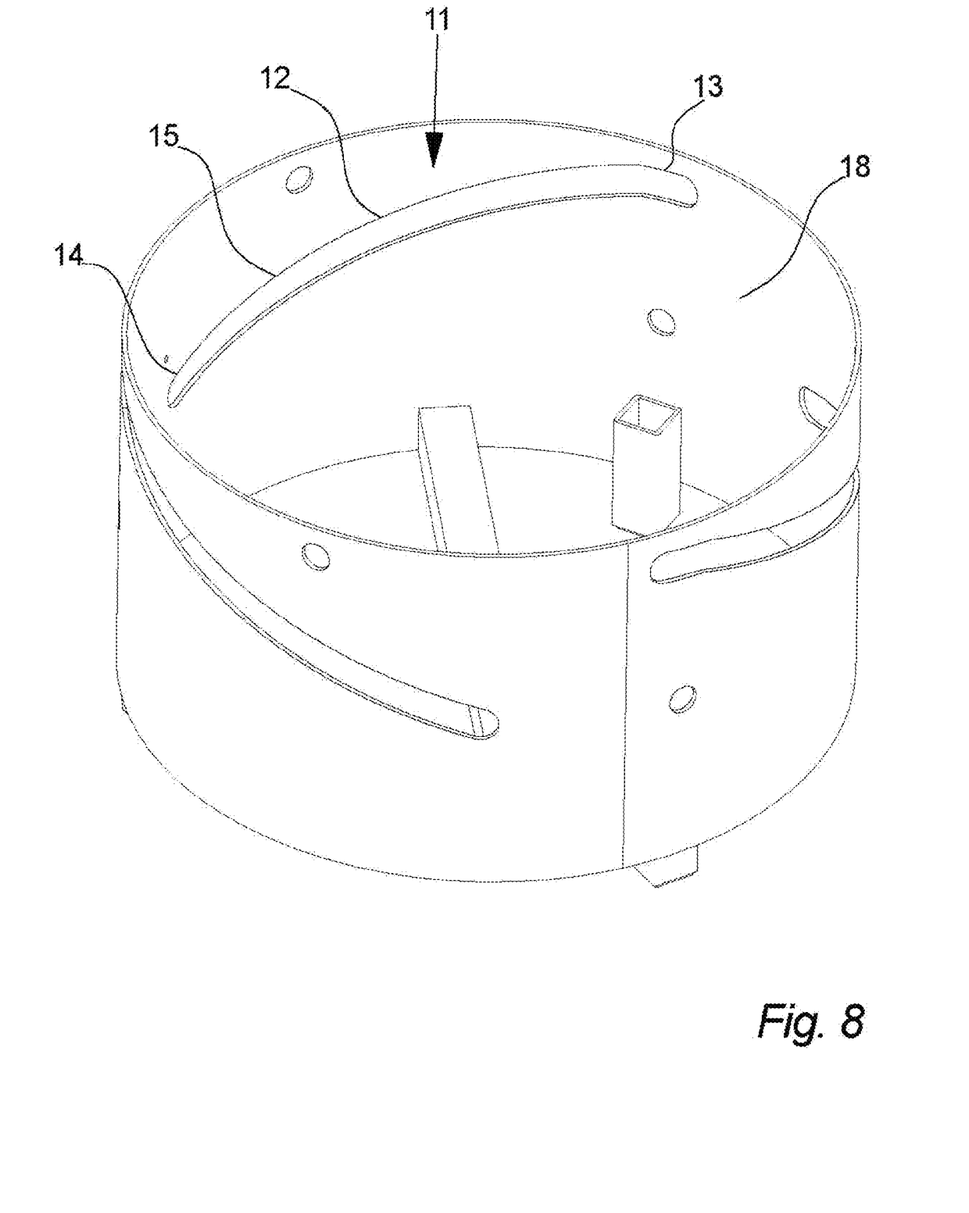
FIG. 8 illustrates the bottom casing of an embodiment of a stationary bottom part, as seen in perspective.

FIG. 8 illustrates the bottom casing 18 of an embodiment of a stationary bottom part 2, as seen in perspective.

In this embodiment of the invention the bottom casing 18 is provided with three track means 11 in the form of cavities 12 extending all the way through the casing material.

In this embodiment of the invention the track means 11 are formed so that only a start part 13 of the track means 11 is formed with a smaller inclination than the middle part 15 of the track means 11. However in another embodiment both the start part 13 and the end part 14 of the track means 11 could be formed slightly more level with a horizontal plane than the middle part 15 of the track means 11.

The invention has been exemplified above with reference to specific examples of designs and embodiments of pallet turntables 1 and pallets 5. However, it should be understood that the invention is not limited to the particular examples described above but may be designed and altered in a multitude of varieties within the scope of the invention as specified in the claims.

LIST

1. Pallet turntable
2. Stationary bottom part
3. Movable top part
4. Platform
5. Pallet
6. Guide means
7. Spring member
8. Fluid powered actuator
9. Pressure accumulator
10. Guide member
11. Track means
12. Cavity
13. Start part of track means
14. End part of track means
15. Middle part of track means
16. Bearing
17. Goods
18. Bottom casing of stationary bottom part
19. Machine foot
20. Bottom port
21. Top port
22. Top casing of moveable top part
23. Fluid connection
24. Pressure compensating throttle check valve 25. Throttle check valve
26. Pressure gauge

The invention claimed is:

1. A pallet turntable comprising,
a stationary bottom part,
a movable top part comprising a platform suitable for receiving a pallet, wherein said movable top part is arranged linearly displaceable in a vertical direction with respect to said stationary bottom part, and
guide means for guiding an angular displacement of said movable top part for rotation thereof in an amount dependent on an amount of said linear displacement at least when said movable top part is being vertically linearly displaced in a direction towards said stationary bottom part,
wherein said guide means comprise one or more guide members connected to a first part of said stationary bottom part and said movable top part and one or more spiral tracks connected to or formed by a second part of said stationary bottom part and said movable top part, said one or more spiral tracks being engaged by the one or more guide members which are movable within the one or more spiral tracks for rotating the movable top part in a spiral motion as the movable top part travels between an extreme top position and an extreme bottom position during vertical linear displacement thereof;
a spring member arranged internally below the platform and encircled by the guide means, said spring member being operable between said stationary bottom part and said movable top part, and being arranged to force said movable top part away from said stationary bottom part towards the extreme top position.

2. A pallet turntable according to claim 1, wherein said force of said spring member is so great that said spring member will force said movable top part into the extreme top position when no load is placed on said platform and at the same time said spring force is so weak that a pallet placed on said platform and weighing in excess of 50 kg will force the moveable top part downwards.

3. A pallet turntable according to claim 1, wherein said spring member comprises a fluid powered actuator.

4. A pallet turntable according to claim 3, wherein said fluid powered actuator is in fluid communication with a pressure accumulator.

5. A pallet turntable according to claim 1, wherein said stationary bottom part has a bottom casing and at least one spiral track is arranged as a cavity formed integrally in said bottom casing of said stationary bottom part.

6. A pallet turntable according to claim 1, wherein a start part and/or an end part of at least one track is formed with a smaller inclination than a middle part of said track.

7. A pallet turntable according to claim 1, wherein said one or more guide members comprises one or more bearings.

8. A pallet turntable according to claim 1, wherein said guide means are arranged for guiding said angular displacement of said movable top part for rotation thereof in the amount dependent on the amount of said linear displacement, both when said movable top part is being vertically linearly displaced in a direction towards said stationary bottom part and when said movable top part is being vertically linearly displaced in a direction away from said stationary bottom part.

9. A pallet turntable according to claim 1, wherein said guide means are arranged so that a full motion of said movable top part from the extreme top position to the extreme bottom position will result in a substantially 90° angular displacement and rotation of said movable top part in relation to said stationary bottom part.

10. A pallet turntable according to claim 2, wherein said spring member comprises a fluid powered actuator.

11. A pallet turntable according to claim 5, wherein a start part and/or an end part of said at least one track is formed with a smaller inclination than a middle part of said track.

12. A method for turning a pallet, said method comprising the steps of:
placing said pallet on a platform of a pallet turntable with the platform positioned at an extreme top position thereof, said turntable including a movable top part arranged vertically above a stationary bottom part so that said movable top part is linearly displaceable in a vertical direction with respect to said stationary bottom part, said pallet turntable having a spring member operable between said stationary bottom part and said movable top part, and being arranged to force said movable top part towards the extreme top position of said movable top part, said pallet turntable having guide members connected to said movable top part and one or more spiral tracks connected to or formed by said stationary bottom part, said one or more spiral tracks being engaged by the guide members which are movable within the one or more spiral tracks for guiding an angular displacement of said movable top part for rotating the movable top part in a spiral motion as the movable top part travels between the extreme top position and an extreme bottom position during vertical linear displacement of the movable top part, said spring member being arranged internally below the platform and encircled by the guide means,
vertically and angularly displacing said platform of said movable top part for rotation of the pallet placed thereon in an amount dependent on an amount of said linear vertical displacement,
displacing said movable top part including said pallet in a downwards going spiral as said guide members are guided through the one or more spiral tracks, thereby rotating the pallet placed on the movable top part, said movable top part being downwardly displaced by means of the gravitational force acting on said pallet.

* * * * *